(12) United States Patent
Ring et al.

(10) Patent No.: US 7,019,051 B2
(45) Date of Patent: *Mar. 28, 2006

(54) POWDER COATING COMPOSITIONS

(75) Inventors: John Ring, Newcastle-upon-Tyne (GB); Gareth Dale Crapper, Tyne & Wear (GB); Kevin Jeffrey Kittle, Co. Durham (GB)

(73) Assignee: International Coatings Limited, London (GB)

( * ) Notice: Subject to any disclaimer, the term of this patent is extended or adjusted under 35 U.S.C. 154(b) by 484 days.

This patent is subject to a terminal disclaimer.

(21) Appl. No.: 10/135,701

(22) Filed: May 1, 2002

(65) Prior Publication Data

US 2002/0169234 A1 Nov. 14, 2002

Related U.S. Application Data

(63) Continuation of application No. 09/749,879, filed on Dec. 29, 2000, now abandoned, which is a continuation of application No. PCT/GB99/02109, filed on Jul. 2, 1999.

(30) Foreign Application Priority Data

Jul. 3, 1998 (GB) .................................... 9814519

(51) Int. Cl.
*C08K 3/34* (2006.01)

(52) U.S. Cl. ...................... 523/216; 523/210; 524/492; 524/493

(58) Field of Classification Search ................ 523/210, 523/216

See application file for complete search history.

(56) References Cited

U.S. PATENT DOCUMENTS

| 3,607,337 A | 9/1971 | Offenbach et al. |
| 3,816,154 A | 6/1974 | Baldyga et al. |
| 4,371,638 A | 2/1983 | Bernelin et al. |
| 4,414,279 A | 11/1983 | Bernelin et al. |
| 5,015,671 A | 5/1991 | Ono et al. |
| 5,206,332 A | 4/1993 | Hammer et al. |
| 5,319,001 A | 6/1994 | Morgan et al. |
| 5,470,893 A | 11/1995 | Sinclair-Day et al. |
| 5,491,202 A | 2/1996 | Umehara et al. |
| 5,735,944 A | 4/1998 | Haubennestel et al. |
| 5,856,378 A | 1/1999 | Ring et al. |
| 6,531,524 B1 * | 3/2003 | Ring et al. ........... 523/205 |

FOREIGN PATENT DOCUMENTS

| EP | 0003932 | 9/1979 |
| EP | 0300818 | 1/1989 |
| EP | 0372860 | 6/1990 |
| EP | 0539385 | 12/1991 |
| FR | 1585800 | 1/1970 |
| GB | 1545780 | 5/1979 |
| GB | 2311527 | 10/1997 |
| JP | 55-123678 | 9/1980 |
| WO | WO 94/11446 | 5/1994 |
| WO | WO 97/08250 | 3/1997 |

* cited by examiner

*Primary Examiner*—Edward J. Cain
(74) *Attorney, Agent, or Firm*—Proskauer Rose LLP

(57) ABSTRACT

Powder coating compositions incorporate, by dry blending, a wax-coated silica additive in finely divided form. Further additives that may be incorporated by dry blending include aluminum oxide and/or aluminum hydroxide. The compositions offer advantages, for example, in terms of fluidity and in terms of first-time deposition of fine particles.

20 Claims, No Drawings

POWDER COATING COMPOSITIONS

CROSS-REFERENCE TO RELATED APPLICATION

This application is a continuation of U.S. patent application Ser. No. 09/749,879, filed Dec. 29, 2000, now abandoned, which is a continuation of the U.S. National Phase designation of co-pending International Application No. PCT/GB99/02109, filed Jul. 2, 1999, in the United Kingdom.

FIELD OF THE INVENTION

This invention relates to powder coating compositions containing wax-coated silica and optionally aluminum oxide and/or aluminum hydroxide additives. The powder coating compositions according to the invention advantageously offer control over particle sizes and show improved fluidity. The invention also relates to processes for coating a substrate using these compositions, as well as coated substrates resulting therefrom.

Powder coatings form a rapidly growing sector of the coatings market. Powder coatings are solid compositions which are generally applied by an electrostatic spray process in which the powder coating particles are electrostatically charged by the spray gun and the substrate is earthed. Charging of the powder in the spray gun is effected by means of an applied voltage or by the use of friction (tribocharging). Conversion of the adherent particles into a continuous coating including, where appropriate, curing of the applied composition) may be effected by heat treatment and/or by radiant energy, notably infra-red, ultra-violet or electron beam radiation. The powder coating particles which do not adhere to the substrate can be recovered for re-use so that powder coatings are economical in use of ingredients. Also, powder coating compositions are generally free of added solvents and, in particular, do not use organic solvents and are accordingly non-polluting.

Powder coating compositions generally comprise a solid film-forming resin, usually with one or more coloring agents such as pigments, and optionally also contain one or more performance additives. They are usually thermosetting, incorporating, for example, a film-forming polymer and a corresponding curing agent (which may itself be another film-forming polymer), but thermoplastic systems (based, for example, on polyamides) can in principle be used instead. Powder coating compositions are generally prepared by intimately mixing the ingredients (including coloring agents and performance additives) for example in an extruder, at a temperature above the softening point of the film-forming polymer(s) but below a temperature at which significant pre-reaction would occur. The extrudate is usually rolled into a flat sheet and comminuted, for example by grinding, to the desired particle size.

In the case of powder coating compositions which are to be applied by electrostatic spraying, film thicknesses of 40 microns to over 100 microns are common. The particle size distribution of the composition will normally be in the range of from 0 to 120 microns, with a mean particle size in the range of from 15 to 75 microns, preferably 25 to 50 microns, more especially 20 to 45 microns.

BACKGROUND OF THE INVENTION

Powder coating compositions of such conventional particle size are widely used in the industry. Some of the known drawbacks encountered with these materials are associated with the application characteristics of the powders. The ease with which the powder fluidizes and is transported through the application equipment affects the uniformity of film weight distribution across the substrate and as a consequence the amount of powder needed to achieve "on average" the desired film thickness. With these conventional powder coatings the first-time deposition of the fine particles (especially powder particles of 10 microns diameter or less) is inefficient leading to an accumulation of fine particles (fines) in the over-sprayed material. In many instances, the over-sprayed material is collected and recycled for re-use. In such systems, as the powder application process continues, the percentage of fine powder particles in the recycled powder increases and the cohesive behavior of the fines starts to influence the properties of the recycled powder. The major effect is that the powder loses fluidity and this causes increasing difficulties in transporting the powder through the recycle system and back to the spray gun.

Another well-known problem with using powder coating compositions of such conventional particle size distribution is the difficulty of applying thin film coatings of, say, 30 microns or less, for which there is an increasing demand in certain sectors of the powder coating market, while achieving a uniform opacity and an aesthetically pleasing appearance, particularly in a gloss white coating. Using compositions of conventional particle size distribution, the achievement of such results is possible only within a restricted range of powder chemistries, with the best performance generally being obtained with polyurethane powders using blocked isocyanates. To achieve coatings of less than 20 microns with a uniform opacity and an aesthetically pleasing appearance with compositions of conventional particle size distribution is very difficult if not impossible.

The problems encountered ("orange-peel" imperfections, etc.) are considered to be attributable to the relatively large size of the majority of the particles in powder coating compositions of conventional particle size distribution. In addition to the increasing demands within the powder coatings market itself, it has also been recognized that the inability of powder coatings reliably and routinely to achieve film thicknesses of 30 microns or less with aesthetically pleasing appearance is one of the factors that has inhibited further substitution of solvent-based "wet" paints by powder coatings.

It has been proposed that the problems of achieving satisfactory thin film powder coatings can in principle be alleviated with the use of powder coating compositions of a finer particle size. There are problems, however, in the fluidization, handling and application of relatively small particles, especially particles which are 10 microns in diameter or less. Such problems become more pronounced as the proportion of fine particles increases, and powder coating compositions have conventionally been manufactured so as to comprise not more than 10% by volume of particles which are 10 microns in diameter or less.

PCT Publication No. WO 94/11446 discloses powder coating compositions which incorporate, by dry-blending, various combinations of two or more additives, the preferred combination being aluminum oxide with aluminum hydroxide. By using combinations of dry-blended additives in accordance with PCT Publication No. WO 94/11446, it is possible to alleviate the problems of fluidization, handling and application of fine particles (especially those of 10 micron diameter or less) as outlined above and also to alleviate other problems attributable to differential and premature electrostatic charging of the powder particles. PCT Publication No. WO 94/11446 is directed to powder coating compositions of which at least 95% by volume has a particle size not exceeding 50 microns.

Although good results are achievable using the additive combinations disclosed in PCT Publication No. WO 94/11446, it has been found, inter alia, that the optimum blend of aluminum oxide/aluminum hydroxide, in terms of the fluidity, transport and handling characteristics of the powder coating composition, tends to detract from the utility of the composition in tribostatic application processes. Attempts to compensate for that effect by increasing the proportion of aluminum oxide in the additive combination tend to result in powder coating compositions having less good fluidity and transport properties.

European Patent No. EP-0300818 suggests that tribocharging characteristics can be conferred on powder coating compositions of conventional particle size distribution by the use of an additive which comprises one or both of aluminum oxide and/or hydroxide, which has been sheared (by highspeed shearing or milling) such that the additive resulting therefrom is a fine, essentially aggregate-free powder which comprises at least 5% by weight of particles of maximum size 0.2 microns. According to European Patent No. EP-0300818, a preferred way of achieving the specified particle size requirement is to add to the aluminum oxide/hydroxide, prior to shearing, a proportion of a fine particle extender of maximum particle size 0.2 microns. The preferred extender disclosed in European Patent No. EP-0300818 is fumed silica, but it has been found that the inclusion of fumed silica tends to detract from the efficiency of an aluminum oxide/aluminum hydroxide additive (as proposed in PCT Publication No. WO 94/11446) in terms of fluidity and transport characteristics, so that the optimum benefit of the additive combination in terms of those characteristics is not achieved.

It would be desirable to find a powder coating composition which incorporates, by dry blending, a wax-coated silica in finely-divided form.

DEFINITIONS

The term "coating," as used herein in relation to silicas for use according to the invention, includes impregnation of porous silica materials, and the expression "coated silica" is to be understood accordingly.

The term "silica," as used herein, includes materials obtained by pyrogenic and, preferably, wet processes leading to precipitated silicas or silica gels, as well as, in principle, mixed metal-silicon oxides and naturally-occurring materials such as, for example, diatomaceous earth. Silicas for use according to the invention will in general have an amorphous structure. The term "silica" includes silicic acid materials. Silicates also come into consideration. A preferred material comprises micronized silica gel.

The term "wax," as used herein, includes: i) Natural animal waxes (for example, beeswax, lanolin); ii) Natural vegetable waxes (for example, carnauba wax); iii) Natural petroleum waxes (for example, paraffin wax, microcrystalline wax); and iv) Synthetic waxes (for example, ethylenic polymers and polyol ether-esters). Mineral waxes other than petroleum waxes may also be included.

SUMMARY OF THE INVENTION

The present invention relates to a dry-blended powder coating composition including a film-forming polymer and wax-coated silica in finely divided form, with the film-forming polymer preferably being present in an amount sufficient to form a coating when deposited on a substrate and the wax-coated silica preferably being present in an amount sufficient to enhance the deposition or uniformity of the coating. Advantageously, the silica can contain a precipitated silica or a silica gel. Also, preferably, the silica is coated with an animal wax, a vegetable wax, a petroleum wax, or a synthetic wax. Alternately, the silica may be coated with a microcrystalline wax.

In one preferred embodiment, the silica is coated with a wax which includes an ester of an aliphatic alcohol having at least 16 carbon atoms with a fatty acid having at least 16 carbon atoms. In another preferred embodiment, the silica is coated with a wax which contains a salt of a fatty acid having at least 16 carbon atoms. Preferably, the silica is coated with a wax which contains aluminum stearate.

Advantageously, the film-forming polymer is the majority component of the composition. Preferably, the wax-coated silica is present in an amount from 0.002 to 2.0% by weight, based on the total weight of the composition without the silica. Also, the wax coated onto the silica is preferably present in an amount from 2 to 10% by weight, based on the weight of the wax and the silica. Additionally, the composition may further contain one or more coloring agents.

In another preferred embodiment, the composition includes aluminum oxide, aluminum hydroxide, or both, wherein the relative weight ratio of wax-coated silica to aluminum oxide, aluminum hydroxide, or both, is from 99:1 to 1:99.

In one embodiment, the total amount of the wax-coated silica and the aluminum-containing components is from 0.1 to 5% by weight, based on the total weight of the composition without the wax-coated silica and the aluminum-containing components. Advantageously, in another embodiment, the wax-coated silica, the aluminum oxide, and the aluminum hydroxide are all present, preferably in relative proportions by weight of from 1 to 98% $SiO_2$, from 1 to 98% $Al_2O_3$, and from 1 to 70% $Al(OH)_3$.

Preferably, the particle size of each of the wax-coated silica and the aluminum-containing components is between 0.1 and 10 microns.

In another preferred embodiment, the film-forming polymer includes a carboxy-functional polyester resin, a hydroxy-functional polyester resin, an epoxy resin, a functional acrylic resin, or a mixture thereof. In another embodiment, the film-forming polymer includes a thermosetting polymer. Advantageously in that embodiment, the composition also includes a curing agent.

In a preferred embodiment, the particle size distribution of the composition is such that one or more of the following criteria is satisfied: 95–100 vol % of the particles are smaller than 50 µm; 90–100 vol % of the particles are smaller than 40 µm; 45–100 vol % of the particles are smaller than 20 µm; 5–100 vol % of the particles are smaller than 10 µm; 1–80 vol % of the particles are smaller than 5 µm; $d(v)_{50}$ is from 1.3 µm to 32 µm; or a combination thereof.

Another aspect of the invention relates to a process for forming a coating on a substrate, which includes applying one of the compositions of the present invention to the substrate, such that the composition preferably adheres to, and forms a continuous coating over at least part of, the substrate. Advantageously, the coated substrate is subjected to a heat treatment or radiant energy to cure the composition and adhere it to the substrate. In one embodiment, the coating thickness is no more than 150 microns.

DETAILED DESCRIPTION OF THE PREFERRED EMBODIMENTS

An important group of waxes for use in accordance with the invention comprises esters of long-chain aliphatic alcohols (typically $C_{16}$ and above) with long-chain fatty acids (typically $C_{16}$ and above). Such esters and acids are preferably straight-chain compounds, and may be saturated or unsaturated. Examples of acids which may be used include stearic acid, palmitic acid and oleic acid and mixtures of two or more thereof.

Waxes derived from long-chain aliphatic compounds as described above may include hydrocarbons.

In addition to esters of the long-chain acids as described above there may be mentioned salts such as, for example, aluminum stearate.

Preferred wax materials for use in accordance with the invention are materials which have good compatibility with the polymer component(s) of the powder coating composition, that is to say, materials which can be mixed homogeneously with the polymers without significant phase separation. It will be found that some wax materials (for example, halogenated waxes) are in general not compatible in this sense with the powder coating polymer(s). The use of such materials would be expected to give rise to defects in the surface appearance of the finished applied coating, and is accordingly not recommended.

Wax-coated silicas suitable for use in accordance with the invention include commercially available materials such as, for example, GASIL 937, from Crosfield (a silica gel coated with microcrystalline paraffin wax) and OK 607, from Degussa (a similar material with a coating which also includes a short-chain ($C_6$) saturated amine or alkyl ammonium component).

Coating of the silica material may be effected by methods known in the art, for example, by co-milling of the silica with a solid wax material, or by admixing the silica material with a wax material dissolved in a suitable solvent which is then evaporated.

The amount of wax coated onto the silica may, for example, be in the range of from 2 to 10% by weight, based on the weight of the silica.

Further information concerning wax-coated silicas that may be used in accordance with the invention may be found in U.S. patent application Ser. Nos. 3,607,337 and 3,816,154, and in PCT Publication No. WO 97/08250. In addition to wax-coated silica, a powder coating composition of the invention may incorporate, also by dry blending, aluminum oxide and/or aluminum hydroxide, preferably aluminum oxide or aluminum oxide and aluminum hydroxide. Aluminum oxyhydroxide may be used in addition to or instead of aluminum hydroxide. It is believed that any of the main structural types of these materials may be used, that is to say:

| α-$Al_2O_3$ | Corundum |
|---|---|
| α-AlO(OH) | Diaspore |
| α-Al(OH)$_3$ | Bayerite |
| γ-$Al_2O_3$ | |
| γ-AlO(OH) | Boehmite |
| γ-Al(OH)$_3$ | Gibbsite |

Preference may be given to γ-structural types.

The proportion of wax-coated silica incorporated in a powder coating composition of the invention may in general be in the range of from 0.002 to 2.0% by weight, based on the total weight of the composition without the additive, advantageously from 0.02 to 1.5% by weight and preferably from 0.04 to 1.0% by weight. In a preferred embodiment, wax-coated silica is present in a proportion of at least 0.2% by weight, preferably 0.3 to 0.7% by weight, for example, 0.3 to 0.5% by weight.

The total content of the wax-coated silica additive(s) and, if present, the other dry-blended additive(s) specified above, incorporated in a powder coating composition of the invention, may in general be in the range of from 0.1 to 5% by weight, based on the total weight of the composition without the additive(s), advantageously 0.1 to 2% by weight, preferably at least 0.2% by weight. In a preferred embodiment, the additive(s) is(are) present in a proportion of 0.2 to 1.5% by weight, preferably of 0.3 to 1% by weight.

In the case in which the powder coating composition 10 includes dry-blended additives comprising wax-coated silica and aluminum oxide, the relative proportions of silica to aluminum oxide may, in general, be in the range of from 99:1 to 1:99, preferably from 80:20 to 20:80, more preferably 70:30 to 30:70, or, for example, 50:50.

In the case in which the dry-blended additives include wax-coated silica and aluminum hydroxide, the relative proportions of silica to the aluminum hydroxide may, in general, be from 99:1 to 30:70, preferably from 90:10 to 40:60, more preferably from 80:20 to 50:50, or, for example, 65:35.

In the case in which the dry-blended additives comprise wax-coated silica, aluminum oxide and aluminum hydroxide, the relative proportions of the additives may, in general, be as follows:

| | $SiO_2$ | $Al_2O_3$ | $Al(OH)_3$ |
|---|---|---|---|
| generally | 1 to 98% | 1 to 98% | 1 to 70% |
| preferably | 5 to 50% | 10 to 90% | 1 to 60% |
| more preferably | 10 to 30% | 20 to 85% | 1 to 55% |

In preferred forms of composition according to the invention, the dry-blended additive(s) consist solely of wax-coated silica or, as the case may be, wax-coated silica with aluminum oxide and/or aluminum hydroxide.

As a generality, the greater the proportion of particles of below 10 microns in diameter in the composition, the higher the proportion of dry-blended additive(s) that is preferred for use in accordance with the invention. This relationship may be illustrated by the following table, which also includes (as independent variables) typical ranges for $d(v)_{50}$ and $d(v)_{99}$ for the compositions:

| % by volume below 10 μm | $d(v)_{50}$ (μm) | $d(v)_{99}$ (μm) | % additive(s) by weight |
|---|---|---|---|
| <18% | 18–22 | 52–58 | 0.6–1.0 |
| <12% | 25–30 | 60–80 | 0.4–0.6 |
| <8% | 30–40 | 80–120 | 0.2–0.4 |

Advantageously, in the case in which there is more than one dry-blended additive, the additives are premixed, preferably intimately and homogeneously by a high-shear technique, before being incorporated in the powder coating composition. In the case of three dry-blended additives, all three may be blended together in a single mixing operation, or any two of the three may first be blended together with the third additive being mixed in afterwards.

Although any additive or mixed sub-combination of additives may in principle be incorporated separately in the powder coating composition, pre-mixing of additives is generally preferred.

The additive(s) of the invention may be incorporated in the powder coating composition by any available dry-blending method, for example:
(a) injection at the mill, with the chip and additive(s) fed into the mill simultaneously;
(b) introduction at the stage of sieving after milling; and
(c) post-production blending in a "tumbler" or other suitable mixing device.

The particle size of each dry-blended additive may be up to 5 microns, or even up to 10 microns in some cases. Preferably, however, the particle size is not greater than 2 microns, more preferably not greater than 1 micron. In general, the lower the thickness of the coating that is to be applied, the smaller the particle size of the additives. The preferred minimum additive particle size is 0.1 microns.

The particle size distribution of the powder coating composition may be in the range of from 0 to 120 microns, with a mean particle size in the range of from 15 to 75 microns, preferably 25–50 microns, more especially 20 to 45 microns.

In the case of relatively fine size distributions, especially where relatively thin applied films are required, for example, the powder coating composition may be one in which one or more of the following criteria is satisfied:

as a condensed glycidyl ether of bisphenol A or a light-stable epoxy resin. Such a carboxy-functional polyester film-forming resin can alternatively be used with a bis(beta-hydroxy-alkylamide) curing agent such as tetrakis(2-hydroxyethyl) adipamide. Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example, the material POWDERLINK 1174, supplied by the Cyanamid Company, or hexahydroxymethyl melamine. A blocked isocyanate curing agent for a hydroxy-functional polyester may, for example, be internally blocked, such as the uret dione type, or may be of the caprolactam-blocked type, for example, isophorone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (i.e., a polyphenol made by adducting bisphenol A and an epoxy resin). A functional acrylic resin, for example a carboxy-, hydroxy- or epoxy-functional resin can be used with an appropriate curing agent. Mixtures of binders can be used, for example a carboxy-functional polyester can be used with a carboxy-functional acrylic resin and a curing agent such as a bis(betahydroxyalkylamide) which serves to cure both polymers. As further possibilities, for mixed binder systems, a

| a) | 95–100% by volume | <50 μm; |
| b) | 90–100% by volume | <40 μm; |
| c) | 45–100% by volume | <20 μm; |
| d) | 5–100% by volume | <10 μm, preferably 10–70% by volume <10 μm; |
| e) | 1–80% by volume | <5 μm, preferably 3–40% by volume <5 μm; or |
| f) | $d(v)_{50}$ in the range of | ~1.3–32 μm, preferably ~8–24 μm. |

Powder coating compositions generally comprise a solid film-forming resin, usually with one or more coloring agents such as pigments, and optionally also contain one or more performance additives. A powder coating composition for use according to the invention will in general be a thermosetting system (incorporating, for example, a film-forming polymer and a corresponding curing agent which may itself be another film-forming polymer), but thermoplastic systems (based, for example, on polyamides) can in principle be used instead.

The film-forming polymer used in the manufacture of a thermosetting powder coating composition for use according to the invention may be one or more selected from carboxy-functional polyester resins, hydroxy-functional polyester resins, epoxy resins, and functional acrylic resins.

The composition may, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight $M_n$ of 1,500 to 10,000 and a glass transition temperature $T_g$ of from 30° C. to 85° C., preferably at least 40° C. The polyepoxide can, for example, be a low molecular weight epoxy compound such as triglycidyl isocyanurate (TGIC), a compound such as diglycidyl terephthalate or diglycidyl isophthalate, an epoxy resin such carboxy-, hydroxy- or epoxy-functional acrylic resin may be used with an epoxy resin or a polyester resin (carboxy- or hydroxy-functional).

Such resin combinations may be selected so as to be co-curing, for example, a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy functional acrylic resin). Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers. Other curing agents which may be mentioned include epoxy phenol novolacs and epoxy cresol novolacs; isocyanate curing agents blocked with oximes, such as isophorone diisocyanate blocked with methyl ethyl ketoxime, tetramethylene xylene diisocyanate blocked with acetone oxime, and DESMODUR W (dicyclohexylmethane diisocyanate curing agent) blocked with methyl ethyl ketoxime; light-stable epoxy resins such as SANTOLINK LSE 120, supplied by Monsanto; and alicyclic polyepoxides, such as EHPE-3150 supplied by Daicel.

The following ranges should be mentioned for the total film-forming resin content of a powder coating composition according to the invention (including curing agent, where appropriate, but disregarding dry blend additives):
40% to 100% by weight,
47% to 100% by weight,
47% to 90% by weight,
53% to 99% by weight, and
53% to 74% by weight.

As already explained, there may be more than one film-forming resin binder and curing agent, as appropriate.

A powder coating composition for use according to the invention may be free from added coloring agents, but usually contains one or more such agents (pigments or dyes). Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane, and quinacridone pigments, vat dye pigments and lakes of acid, basic and mordant dyestuffs. Dyes can be used instead of or as well as pigments.

The composition of the invention may also include one or more extenders or fillers, which may be used inter alia to assist opacity, while minimizing costs, or more generally as a diluent.

The following ranges should be mentioned for the total pigment/filler/extender content of a powder coating composition according to the invention (disregarding dry blend additives):
0% to 55% by weight,
0% to 50% by weight,
10% to 50% by weight,
0% to 45% by weight, and
25% to 45% by weight Of the total pigment/filler/extender content, a pigment content of not more than 40% by weight of the total composition (disregarding dry blend additives) may be used. Usually a pigment content of 25–30% is used, although in the case of dark colors opacity can be obtained with less than 10% by weight of pigment.

The composition of the invention may also include one or more performance additives, for example, a flow-promoting agent, a plasticiser, a stabilizer against UV degradation, or an anti-gassing agent, such as benzoin, or two or more such additives may be used. The following ranges should be mentioned for the total performance additive content of a powder coating composition according to the invention (disregarding dry blend additives):
0% to 5% by weight,
0% to 3% by weight, and
1% to 2% by weight.

In general, coloring agents, fillers/extenders, and performance additives as described above will be incorporated before and/or during the extrusion or other homogenization process, and not by dry blending.

A powder coating composition according to the invention may in principle be applied to a substrate by any of the processes of powder coating technology, for example, by electrostatic spray coating (corona-charging or tribo-charging) or by fluidized-bed or electrostatic fluidized-bed processes.

After application of the powder coating composition to a substrate, conversion of the resulting adherent particles into a continuous coating (including, where appropriate, curing of the applied composition) may be effected by heat treatment and/or by radiant energy, notably infra-red, ultra-violet, or electron beam radiation.

The powder is usually cured on the substrate by the application of heat (the process of stoving); the powder particles melt and flow, and a film is formed. The curing times and temperatures are interdependent in accordance with the composition formulation that is used, and the following typical ranges may be mentioned:

| Temperature(° C.) | Time |
|---|---|
| 280 to 100* | 10 secs. to 40 mins. |
| 250 to 150 | 15 secs. to 30 mins. |
| 220 to 160 | 5 mins. to 20 mins. |

*Temperatures down to 90° C. may be used for some resins, especially certain epoxy resins.

The substrate may comprise a metal, a heat-stable plastics material, wood, glass, or a ceramic or textile material. Advantageously, a metal substrate is chemically or mechanically cleaned prior to application of the composition, and is preferably subjected to chemical pre-treatment, for example, with iron phosphate, zinc phosphate or chromate. Substrates other than metallic are in general preheated prior to application or, in the case of electrostatic spray application, are pre-treated with a material that will aid such application.

Used as a single-component additive, wax-coated silica offers the possibility of eliminating or at least reducing the electrostatic interactions between the powder coating particles and between the powder particles and the tubing used for transport of powder coating compositions to the application equipment. This in turn offers the possibility of achieving improved fluidity properties, with the further inherent practical advantage of avoiding the additional manufacturing procedures, quality control measures, and costs involved in utilizing a multi-component dry-blended additive.

The use of the wax-coated silica in the ternary additive of the invention offers the possibility of increasing the benefits, especially in terms of fluidity, provided by the previously proposed aluminum oxide/aluminum hydroxide combination alone. In particular, for example, the use of the wax-coated silica in tribo-charging systems offers the possibility of using aluminum oxide-rich additive blends to promote tribo-charging without detracting from the good fluidity, transport, and handling properties attributable to the aluminum additive combination.

In general, the use of one or more additives in accordance with the invention offers an improvement in the first-time deposition of fine particles (especially particles of 10 microns or less), which in turn leads to improved uniformity of film weight on the substrate (and hence to a reduction in the amount of powder needed to achieve a given nominal film weight) and to reduced accumulation of fine particles in the recycling system.

The improved first-time deposition of fine powder coating particles that can be achieved in accordance with the invention also has the advantageous consequence of enabling a higher proportion of such particles to be accommodated in powder coating compositions without undue deleterious effects. In principle, this in turn contributes to improved film appearance and tends to facilitate the production of thin films.

The invention is applicable over a wide range of film thicknesses, typically from thin films of, for example, 30 microns or less up to films of 100 to 150 microns.

EXAMPLES

The following Examples illustrate the invention. The aluminum oxide used in the Examples was Aluminum Oxide C, from Degussa, mean particle size <0.2 microns; the aluminum hydroxide used was MARTINAL OL 103C, from Omya Croxton & Garry, mean particle size~0.8 microns; and the silica used was GASIL 937, from Crosfield, mean particle size~6.5 microns (a micronized silica gel coated with microcrystalline paraffin wax).

The dry-blend additive compositions used in the Examples were prepared as follows:

| Dry-blend Additive Composition 1 | |
|---|---|
| Aluminum oxide | 7.2 parts by weight |
| Aluminum hydroxide | 8.8 parts by weight |
| Silica | 4.0 parts by weight |

The additive materials were charged to a Moulinex II high-shear blender, mixed for 30 seconds and allowed to cool. The mixing and cooling process was repeated twice to give a total of three operations. The resulting mixed additive was reserved for future use.

| Dry-blend Additive Composition 2 | |
|---|---|
| Aluminum oxide | 5.4 parts by weight |
| Aluminum hydroxide | 6.6 parts by weight |
| Silica | 8.0 parts by weight |

The additive materials were charged to a Moulinex II high-shear blender, mixed for 30 seconds and allowed to cool. The mixing and cooling process was repeated twice to give a total of three operations. The resulting mixed additive was reserved for future use.

| Dry-blend Additive Composition 3 | |
|---|---|
| Aluminum oxide | 10 parts by weight |
| Silica | 10 parts by weight |

The additive materials were charged to a Moulinex II high-shear blender, mixed for 30 seconds and allowed to cool. The mixing and cooling process was repeated twice to give a total of three operations. The resulting mixed additive was reserved for future use.

| Dry-blend Additive Composition 4 | |
|---|---|
| Aluminum hydroxide | 7 parts by weight |
| Silica | 13 parts by weight |

The additive materials were charged to a Moulinex II high-shear blender, mixed for 30 seconds and allowed to cool. The mixing and cooling process was repeated twice to give a total of three operations. The resulting mixed additive was reserved for future use.

Dry-blend Additive Composition 5

Silica

The additive material was used as supplied.

| Dry-blend Additive Composition 6 | |
|---|---|
| Aluminum oxide | 12.8 parts by weight |
| Aluminum hydroxide | 3.2 parts by weight |
| Silica | 4 parts by weight |

The additive materials were charged to a Moulinex II high-shear blender, mixed for 30 seconds and allowed to cool. The mixing and cooling process was repeated twice to give a total of three operations. The resulting mixed additive was reserved for future use.

| Dry-blend additive composition 7 | |
|---|---|
| Aluminum oxide | 6.7 parts by weight |
| Aluminum hydroxide | 6.7 parts by weight |
| Silica | 6.7 parts by weight |

The additive materials were charged into a Moulinex II high-shear blender, mixed for 30 seconds and allowed to cool. The mixing and cooling process was repeated twice to give a total of three operations. The resulting mixed additive was reserved for future use.

The particle size distribution data reported in the Examples was obtained using the equipment indicated in each case (Coulter Counter Multisizer II or the Mastersizer X laser light-scattering device from Malvern Instruments). The data is expressed partly in volume percentiles $d(v)_x$, where x is the percentage of the total volume of the particles that lies below the stated particle size, d. Thus, for instance, $d(v)_{50}$, is the median particle size of the sample.

Example 1

White Matt Polyester Powder Coating Composition—Deposited Film Weight Tests

The composition of Example 1 was prepared from two components as follows:

| Component A | % by weight |
|---|---|
| Carboxy-functional polyester polymer, Acid Value 77 | 26.40 |
| PRIMID XL552 (EMS Grilon) | 2.80 |
| Benzoin | 0.15 |
| Flow agent | 0.40 |
| PTFE modified polyethylene wax | 1.00 |
| GRILONIT 68022 (EMS Grilon polyolefin matting agent) | 0.20 |
| Rutile titanium dioxide | 17.00 |
| Extender | 2.00 |

| Component B | % by weight |
|---|---|
| Carboxy-functional polyester polymer, Acid Value 29 | 23.70 |
| PRIMID XL552 (EMS Grilon) | 0.75 |
| Benzoin | 0.15 |
| Flow agent | 0.40 |
| PTFE modified polyethylene wax | 1.00 |
| GRILONIT 68022 (EMS Grilon polyolefin matting agent) | 0.20 |
| Rutile titanium dioxide | 17.00 |
| Extender | 2.00 |
| Hydroxy-functional polyester polymer, Hydroxyl Value 45 | 4.80 |

The ingredients for Component A were dry mixed in a blender, and fed into a twin-screw extruder operating at a temperature of 108° C. The extrudate was rolled flat on a chilled plate and broken into chip form (ca. 1 cm mesh). The ingredients for Component B were likewise dry mixed in a blender, and fed into a twin-screw extruder operating at a temperature of 108° C. The extrudate was rolled flat on a chilled plate and broken into chip form (ca. 1 cm mesh). The two Components thereby obtained in chip form were thoroughly mixed in equal weight ratios and then ground in an impact mill to produce a powder coating composition I having the following particle size distribution (determined using a Coulter Counter Multisizer II):

| | |
|---|---|
| $d(v)_{99}$ | <115 microns |
| $d(v)_{50}$ | <45 microns |
| 5.2% | <10 microns |
| 1.6% | <5 microns |

A part of the powder coating composition I was then dry blended with a 0.4% by weight addition of additive composition 1 (aluminum oxide/aluminum hydroxide/wax-coated silica—20% of total additive by weight). The resulting composition was then electrostatically spray applied to perforated steel ceiling tiles (585 mm wide×585 mm high× 0.5 mm thick, each tile being perforated by a grid of 101×101 holes of approximately 2 mm diameter and 4 mm separation) using an ITW Gema Volstatic corona application gun (gun settings: fluidizing air 1.0 bar, 35 conveying air 0.6 bar, supplementary air 3 m³/hour, single corona needle conical baffle nozzle at 70 kV) and reciprocator (reciprocator settings: speed 0.35 m/s in both vertical directions, traverse 66 cm about the center of the ceiling tile). The ceiling tiles were introduced to the application booth by means of a moving track (track speed: 1.22 m/min). The applied powder coatings were stoved to give cured films of 70.5 microns average film thickness, (stoving conditions: 15 minutes at 180° C.).

A further part of the powder coating composition I was then dry blended with a 0.4% by weight addition of additive composition 2 (aluminum oxide/aluminum hydroxide/wax-coated silica—40% of total additive by weight). This was applied and stoved under the same conditions as above to give cured films of 73.5 microns average film thickness.

In order to provide a basis for comparison with Example 1, a further part of the powder coating composition I was dry blended with a 0.1% by weight addition of an uncoated pyrogenic silica (ACEMATT TS 100 from Degussa). Application and stoving of the resulting composition under the same conditions as Example 1 gave cured films of average film thickness 39.0 microns on the steel ceiling tiles.

The greater film weight obtained when using additive compositions in accordance with the invention offers the possibility of increasing the rate of passage of substrate articles through the spray-coating booth, with resulting productivity gains, and/or reducing the air pressure used to transport powder through the application system, leading to reduced equipment wear. Also, it may be noted that increasing the proportion of wax-coated silica in the additive (from 20% by weight in additive composition 1 to 40% by weight in additive composition 2) did not significantly affect the film weight deposited under the described application and stoving conditions.

Example 2

White Matt Polyester Powder Coating Composition—Transfer Efficiency Test

A quantity of the powder composition I from Example 1 was dry-blended with a 0.4% by weight addition of additive composition 1 (aluminum oxide/aluminum hydroxide/wax-coated silica—20% of total additive by weight). The resulting composition was then applied to a single fixed panel (dimensions: height 61 cm, width 40 cm) using an ITW Gema Volstatic powder coating application unit (gun settings: fluidizing air 1.0 bar, conveying air 0.6 bar, supplementary air 3 m³/hour, single corona needle conical baffle nozzle at 70 kV centered on the panel at a distance of 29 cm from the panel) for 10 seconds. The weight of powder adhering to the panel was measured. The weight of powder lost from the fluidized-bed powder reservoir during application was measured. The transfer efficiency was calculated according to the following Equation I (static test):

$$\text{Transfer Efficiency (\%)} = \frac{M_{Panel}(t)}{M_F(t)} * 100 \quad \text{Equation I:}$$

where:

$M_{panel}(t)$=mass of powder coating on the panel after application time, t.

$M_F(t)$=mass of powder lost from the fluidized-bed reservoir after application time, t.

The panel was cleaned, and the transfer efficiency test repeated for 20 seconds application time and 30 seconds application time.

A further quantity of the powder coating composition I was then dry blended with a 0.4% by weight addition of additive composition 2 (aluminum oxide/aluminum hydroxide/wax-coated silica—40% of total additive by weight). The 10-, 20-, and 30-second transfer efficiencies of the resulting composition were measured as described above.

In order to provide a basis for comparison with Example 2, the application and testing procedure was repeated using a further quantity of the powder coating composition I, this time dry blended with a 0.1% by weight addition of the uncoated pyrogenic silica additive TS 100 as used in Example 1.

The results obtained are summarized in Table 1 below (in each case, the summary figure representing the average of a series of experiments):

TABLE 1

| Additive | Transfer Efficiency (%) | | |
|---|---|---|---|
| | 10 secs. | 20 secs. | 30 secs. |
| Comparison (TS 100) | 76 | 74 | 74 |
| Additive Composition 1 | 74 | 71 | 71 |
| Additive Composition 2 | 72 | 69 | 68 |

Considering the transfer efficiency data summarized above in conjunction with the deposition data from Example 1, it can be seen that the greatly increased throughput shown in Example 1 can more than compensate for the slightly reduced transfer efficiency shown in Example 2 when using an additive comprising a wax-coated silica in accordance with the present invention. This offers the possibility of achieving the beneficial effects of aluminum oxide addition without adverse effects derived from reduced transfer efficiency.

In order to provide a further comparison between the additive compositions according to the invention in Example 2 and the TS 100 uncoated silica additive, the powder application procedure was repeated with adjustment of the conveying air pressure so as to obtain approximately the same throughput (approximately 2 g/sec) in each case. The conveying air pressure required for this purpose in the case of the TS 100 additive was 1.5 bar, whereas the required pressure was only 1.1 bar in the case of the additive compositions of Example 2. The mass of powder coated onto the substrate panel per unit time was determined in each experiment, and Table 2 below gives the results in summary form (in each case, the summary figure representing the average of a series of experiments at 10-, 20- and 30-second application time).

TABLE 2

| Additive | Transfer Efficiency (%) | | |
|---|---|---|---|
| | 10 secs. | 20 secs. | 30 secs. |
| Comparison (TS 100) | 1.88 ± 0.39 | 1.41 ± 0.01 | 1.46 ± 0.03 |
| Additive Composition 1 | 1.63 ± 0.13 | 1.59 ± 0.09 | 1.51 ± 0.04 |
| Additive Composition 2 | 1.63 ± 0.10 | 1.45 ± 0.01 | 1.46 ± 0.06 |

It will be seen that the mass coated per unit time shows little or no significant difference between the TS 100 additive and the additive compositions of the invention. At the same time, however, the conveying air pressure required to maintain throughput constant at approximately 2 g/sec was significantly lower in the case of the additive compositions of the invention, which in turn means less wear on the application equipment while obtaining comparable results in other respects.

Example 3

White Semi-gloss Polyester Powder Coating Composition—Performance Testing

The composition of Example 3 was prepared as follows:

| | % by weight |
|---|---|
| Carboxy-functional polyester polymer, Acid Value 29 | 51.90 |
| PRIMID XL 552 (EMS Grilon) | 1.90 |
| Flow agent | 0.80 |
| Polyethylene wax | 0.20 |
| Benzoin | 0.20 |
| Rutile titanium dioxide | 30.00 |
| Extender | 15.00 |

The ingredients were dry mixed in a blender and fed into a twin-screw extruder operating at 108° C. The extrudate was rolled flat on a chilled plate and broken into chip form.

Two batches of milled powder were prepared from the resulting chip: one batch incorporating by dry blending a 0.5% by weight addition of additive composition 1 in accordance with the invention, and the other incorporating by dry blending—as a basis for comparison—a 0.1% by weight addition of aluminum oxide. Additive composition 1 (aluminum oxide/aluminum hydroxide/wax-coated silica—20% of total additive by weight) was incorporated by volumetric feed injection into the mill. The aluminum oxide was incorporated by blending into the chip prior to milling.

In each case the milling was carried out in an impact mill (Hosokawa Micron ACM 5) to produce a composition having the following particle size distribution (determined using a Malvern Mastersizer X):

| $d(v)_{99}$ | <106 microns |
|---|---|
| $d(v)_{50}$ | ~42 microns |
| 7.5% | <10 microns |

As a basis for comparison, the powder incorporating the aluminum oxide additive was applied by electrostatic spray to a series of steel garage doors comprising light gauge panels surrounded by a heavy gauge frame. The light gauge panels were formed with a series of transverse recesses each 0.5 cm deep and 0.5 cm wide. The powder coating composition was applied using Nordson VERSASPRAY II electrostatic spray guns, with 18 guns coating the front surface of the doors and 10 guns coating the rear surface of the doors. The garage doors were introduced into the application booth by means of a moving track (track speed: 5 m/min). The applied powder coatings were stoved to give cured films (stoving conditions of half electric IR, half electric convection oven, with total time in oven 6.5 minutes).

The gun settings used were as follows:

| Gun Number | Powder Air (psi) | Diluting Air (psi) | Gun Voltage (kV) |
|---|---|---|---|
| 1 (front) | 24 | 24 | 100 |
| 2 (front) | 26 | 27 | 100 |
| 3 (front) | 28 | 28 | 100 |
| 4 (front) | 28 | 28 | 100 |
| 5 (front) | 32 | 26 | 100 |
| 6 (front) | 34 | 30 | 100 |
| 7 (front) | 26 | 27 | 100 |
| 8 (front) | 24 | 28 | 100 |
| 9 (front) | 28 | 28 | 100 |
| 10 (front) | 24 | 26 | 100 |
| 11 (front) | 24 | 26 | 100 |
| 12 (front) | 26 | 24 | 100 |
| 13 (front) | 26 | 26 | 100 |
| 14 (front) | 30 | 30 | 100 |

-continued

| Gun Number | Powder Air (psi) | Diluting Air (psi) | Gun Voltage (kV) |
|---|---|---|---|
| 15 (front) | 25 | 24 | 100 |
| 16 (front) | 22 | 24 | 100 |
| 17 (front) | 24 | 26 | 100 |
| 18 (front) | 28 | 26 | 100 |
| 19 (back) | 20 | 22 | 100 |
| 20 (back) | 22 | 28 | 100 |
| 21 (back) | 20 | 22 | 100 |
| 22 (back) | 30 | 30 | 100 |
| 23 (back) | 26 | 26 | 100 |
| 24 (back) | 27 | 28 | 100 |
| 25 (back) | 20 | 24 | 100 |
| 26 (back) | 24 | 29 | 100 |
| 27 (back) | 24 | 30 | 100 |
| 28 (back) | 30 | 26 | 100 |

Using these conditions the average coating weight per garage door was 822 g, with a standard deviation of 29 g (based upon coating 16 garage doors). The penetration of the powder coating into the recessed areas was visually assessed as inadequate; substrate could be seen through the coating. The average film thickness on the heavy gauge supporting frame was 66 microns with a standard deviation of 22 microns (based upon 32 measurements over two garage doors). The average film thickness on the light gauge door surface was 53 microns with a standard deviation of 8 microns (based upon 24 measurements over two garage doors).

The powder coating composition incorporating additive composition 1 in accordance with the invention, was electrostatically spray applied to garage doors using exactly the same gun and booth conditions as above. The applied powder coatings were stoved to give cured films (stoving conditions of half electric IR, half electric convection oven, with total time in oven 6.5 minutes).

Using these conditions the average coating weight per garage door was 751 g, with a standard deviation of 59 g (based upon coating 18 garage doors). The penetration of the powder coating into recessed areas was visually assessed as superior to the comparison formulation, despite the lower average coating weight per garage door. The average film thickness on the heavy gauge supporting frame was 57 microns with a standard deviation of 20 microns (based upon 48 measurements over three garage doors). The average film thickness on the light gauge door surface was 49 microns with a standard deviation of 10 microns (based upon 36 measurements over three garage doors).

Example 4

White Gloss Polyester Powder Coating Composition

The composition of Example 4 was prepared as follows:

| | % by weight |
|---|---|
| Carboxy-functional polyester polymer, Acid value 40 | 50.08 |
| TGIC PT810 (Ciba-Geigy) | 3.77 |
| Benzoin | 0.15 |
| PTFE modified polyethylene wax | 1.00 |
| Flow agent | 0.80 |
| Rutile titanium dioxide | 30.00 |
| Extender | 14.20 |

The ingredients were dry mixed in a blender and fed into a twin-screw extruder operating at 105° C. The extrudate was rolled flat on a chilled plate and broken into chip form. Three batches of milled powder were prepared from the resulting chip: one batch incorporating by dry blending a 0.4% by weight addition of additive composition 3 in accordance with the invention (aluminum oxide/wax-coated silica), one batch incorporating by dry blending a 0.4% by weight addition of additive composition 4 (aluminum hydroxide/wax–coated silica), and one batch incorporating by dry blending a 0.4% by weight addition of additive composition 5 (wax-coated silica alone).

In each case the milling was carried out in an impact mill (Hosokawa ACM5) to produce a composition having the following particle size distribution (Malvern Mastersizer X):

| | |
|---|---|
| $d(v)_{99}$ | <97 microns |
| $d(v)_{50}$ | ~37 microns |
| 8.5% | <10 microns |

The resulting powder coating compositions were spray applied to flat aluminum panels (0.8 m×0.8 m) using an ITW Gema Volstatic corona application gun (gun settings: fluidizing air 1.0 bar, conveying air 0.6 bar, supplementary air 3.5 m³/hour, single corona needle conical baffle nozzle at 50 kV) and reciprocator (reciprocator settings: speed 0.35 m/sec in both vertical directions, traverse of 90 cm about the center of the aluminum panel). The panels were introduced to the application booth by means of a moving track (track speed: 0.98 m/min). The moving panel transfer efficiency was according to the following Equation II (moving-panel test):

Equation II:
$$\text{Transfer Efficiency (\%)} = \frac{M_{panel}}{\text{Throughput} * (\text{Panel length/ track speed})} * 100$$

where:

$M_{Panel}$=mass of powder coating on the panel after one pass across the application gun.

Throughput=mass of powder lost from the fluidized-bed reservoir during application (g/sec)

The panel length divided by the track speed gives the total time that the panel is in front of the application gun.

The results cited in Table 3 below are the average of three experiments. In addition a ceiling tile (as described in Example 1) was coated using these application conditions. The coated ceiling tile was stoved to give cured films (stoving conditions: 15 minutes at 180° C.).

TABLE 3

| Powder coating containing | Transfer efficiency data (%)* | Stoved ceiling tile film thickness (μm)* |
|---|---|---|
| Additive Composition 3 | 56.3 ± 2.0 | 36 ± 9 |
| Additive Composition 4 | 57.8 ± 3.1 | 61 ± 16 |
| Additive Composition 5 | 52.5 ± 1.8 | 53 ± 17 |

*± figures denote 1 standard deviation in data.

It will be seen that there is no significant difference between the transfer efficiencies achieved using the three different additive compositions of the invention; all of the values achieved are considered acceptable. At the constant application pressure employed in the experiments the applied film thickness achieved with composition 3 (aluminum oxide/wax-coated silica) was relatively low, but the throughput was also relatively low, reflecting the different fluidizing efficiency of composition 3. A greater film thickness could in principle have been achieved by increasing the air pressure to achieve a higher throughput.

Example 5

Study of Deposition of Fines—Transfer Efficiency White Gloss Polyester-epoxy Hybrid Powder Coating The composition of Example 5 was prepared as follows:

|  | % by weight |
|---|---|
| Carboxy-functional polyester polymer, Acid value 55 | 32.31 |
| Type 2 epoxy resin (GT7072, from Ciba-Geigy) | 21.54 |
| Benzoin | 0.15 |
| PTFE modified polyethylene wax | 1.00 |
| Flow agent | 0.80 |
| Rutile titanium dioxide | 40.00 |
| Extender | 4.20 |

The ingredients were dry mixed in a blender and fed into a twin-screw extruder operating at 90° C. The extrudate was rolled flat on a chilled plate and broken into chip form.

Two batches of milled powder were prepared from the resulting chip: one batch incorporating by dry blending a 0.4% by weight addition of Additive Composition 6 in accordance with the invention, and one batch incorporating by dry blending, in order to provide a basis for comparison, a 0.4% by weight addition of an additive composition comprising 80% by weight of aluminum oxide, and 20% by weight of aluminum hydroxide.

In each case the milling was carried out in an impact mill (Hosokawa ACMS) to produce a composition having the following particle size distribution (Malvern Mastersizer X):

| | |
|---|---|
| $d(v)_{99}$ | <55 microns |
| $d(v)_{50}$ | ~21 microns |
| 12.0% | <10 microns |

The resulting powder coating compositions were spray applied to flat aluminum panels (0.8 m×0.8 m) using a Nordson type II tribostatic application gun (gun settings: fluidizing air 1 bar, conveying air 4 bar, supplementary air 4 bar, eight finger diffuser nozzle attachment) and reciprocator (reciprocator settings: upper limit "1.6," lower limit "5.4," speed in both directions "6"). The panels were introduced to the application booth by means of a moving track (track speed: 2.6 m/min). The moving panel transfer efficiency was calculated as described in Example 4. The results cited in Table 4 below are the average of three experiments.

Without curing, samples of applied powder coating were removed from the panels and the particle size distribution of the applied powder was measured by means of a Malvern Mastersizer X.

TABLE 4

| Powder . . . | containing Additive Composition 6 | for comparison |
|---|---|---|
| $d(v)_{99}$ | 55 μm | 51 μm |
| $d(v)_{50}$ | 28 μm | 25 μm |
| % <10 μm | 7% | 4% |
| Transfer Efficiency | 61%* | 49%** |

*Standard deviation: ~7.5%;
**Standard deviation: ~7%

It will be seen that the transfer efficiency 20 achieved using the ternary Additive Composition 6 according to the invention (aluminum oxide/aluminum hydroxide/wax-coated silica, with a 4:1 ratio of aluminum oxide to aluminum hydroxide) was significantly better than that achieved in the comparison experiment (aluminum oxide/aluminum hydroxide additive, also 4:1, but no wax-coated silica).

It will also be seen that, to a simple approximation, the proportion of the sub-10 micron fines fraction deposited on the substrate was much greater for the powder incorporating the additive composition according to the invention than for the powder incorporating the comparison additive. This result offers various advantages as discussed hereinbefore.

Example 6

Seven batches of milled powder were prepared from powder coating composition chip prepared as described in Example 5. Four of the batches incorporated, by dry blending, 0.4% by weight additions of additive compositions 3, 4, 5, and 7 in accordance with the invention. In order to provide a basis for comparison, the remaining three batches incorporated, by dry blending, 0.4% by weight additions of aluminum oxide, aluminum hydroxide, and an aluminum oxide/aluminum hydroxide mixture comprising 50% by weight of each component and prepared as described for the mixed additive compositions of the invention.

In each case the milling was carried out in an impact mill to produce a composition having the following particle size distribution (Malvern Mastersizer X):

| | |
|---|---|
| $d(v)_{99}$ | <57 microns |
| $d(v)_{50}$ | ~22 microns |
| 18% | <10 microns |

The transfer efficiency of the resulting powder coating compositions was assessed by a parallel plate test. An arrangement of two metal plates (each 1 m×1 m) separated by 30 cm was used in a non-extracted booth housed in a conventional powder spray booth. Prior to carrying out the transfer efficiency test, the application air pressure was adjusted to obtain a throughput of 4.1±0.6 g/sec (fluidizing air pressure 1.5–2.0 bar to achieve the desired throughput, conveying air 2.5 bar, supplementary air 1.8 bar).

The powder was sprayed using a Nordson Type II tribo 35 gun with the Nordson eight-finger diffuser attachment. Powder was sprayed for 20 seconds into the booth. The weight of powder adhering to the parallel plates was measured, as was the weight of coating lost from the fluidized bed during spraying. The ratio of these two weights was used to calculate the transfer efficiency in each case, as described in Example 2. Tests were repeated three times for each powder coating sample.

Without curing, samples of applied powder coating were removed from the panels and the particle size distribution of the applied powder was measured by means of a Malvern Mastersizer X. The resulting data was used to calculate the percentage of sub-10 micron fine particles deposited in each case.

The deposition efficiency and % fines deposited data are summarized in the following Table 5:

TABLE 5

| Additive | Transfer Efficiency | % Fines deposited |
| --- | --- | --- |
| Composition 3 ($Al_2O_3/SiO_2$) | 71.9 ± 3.7% | 100% |
| Composition 4 ($Al(OH)_3/SiO_2$) | 74.7% | 94.5% |
| Composition 5 ($SiO_2$) | 70.7 ± 2.0% | 98.6 ± 0.3% |
| Composition 7 ($Al_2O_3/Al(OH)_3/SiO_2$) | 78.9 ± 1.5% | 92.3 ± 1.8% |
| Comparison ($Al_2O_3$) | 68.9 ± 0.7% | 88.9 ± 2.6% |
| Comparison ($Al(OH)_3$) | 70.4 ± 3.2% | 93.4 ± 2.2% |
| Comparison ($Al_2O_3/Al(OH)_3$) | 68.9 ± 1.3% | 95.0 ± 0.8% |

Taking into account both transfer efficiency and fines deposition, the results achieved using the additives according to the invention were superior to those achieved using the various comparison additives.

In addition, the best results in terms of transfer efficiency were achieved using the ternary additive of the invention, and the best results in terms of fines deposition were achieved using the aluminum oxide/waxed silica additive of the invention, while the waxed silica sole additive of the invention give results which were almost as good.

What is claimed is:

1. A dry-blended powder coating composition comprising a film-forming polymer and wax-coated silica in finely divided form, with the film-forming polymer present in an amount sufficient to form a coating when deposited on a substrate and the wax-coated silica being present in an amount sufficient to enhance the deposition or uniformity of the coating.

2. The powder coating composition of claim 1, wherein the silica comprises a precipitated silica or a silica gel, and wherein the silica is coated with an animal wax, a vegetable wax, a petroleum wax, or a synthetic wax.

3. The powder coating composition of claim 1, wherein the silica is coated with a microcrystalline wax.

4. The powder coating composition of claim 1, wherein the silica is coated with a wax which comprises an ester of an aliphatic alcohol having at least 16 carbon atoms with a fatty acid having at least 16 carbon atoms.

5. The powder coating composition of claim 1, wherein the silica is coated with a wax which comprises a salt of a fatty acid having at least 16 carbon atoms.

6. The powder coating composition of claim 5, wherein the silica is coated with a wax which comprises aluminum stearate.

7. The powder coating composition of claim 1, wherein:
the film-forming polymer is the majority component of the composition;
the wax-coated silica is present in an amount from 0.002 to 2.0% by weight, based on the total weight of the composition without the silica; and
the wax coated onto the silica is present in an amount from 2 to 10% by weight, based on the weight of the wax and the silica.

8. The powder coating composition of claim 1, further comprising aluminum oxide, aluminum hydroxide, or both, wherein the relative weight ratio of wax-coated silica to aluminum oxide, aluminum hydroxide, or both, is from 99:1 to 1:99.

9. The powder coating composition of claim 8, wherein the total amount of the wax-coated silica and the further aluminum oxide, aluminum hydroxide, or both, is from 0.1 to 5% by weight, based on the total weight of the composition without the wax-coated silica and the further aluminum oxide, aluminum hydroxide, or both.

10. The powder coating composition of claim 8, wherein the wax-coated silica, the aluminum oxide, and the aluminum hydroxide are all present in relative proportions by weight of from 1 to 98% $SiO_2$, from 1 to 98% $Al_2O_3$, and from 1 to 70% $Al(OH)_3$.

11. The powder coating composition of claim 8, wherein the particle size of each of the wax-coated silica and the further aluminum oxide, aluminum hydroxide, or both, is between 0.1 and 10 microns.

12. The powder coating composition of claim 1, wherein the film-forming polymer comprises a carboxy-functional polyester resin, a hydroxy-functional polyester resin, an epoxy resin, a functional acrylic resin, or a mixture thereof.

13. The powder coating composition of claim 1, wherein the film-forming polymer comprises a thermosetting polymer and the composition also includes a curing agent.

14. The powder coating composition of claim 1, wherein the particle size distribution of the composition is such that one or more of the following criteria is satisfied:
95–100 vol % of the particles are smaller than 50 µm;
90–100 vol % of the particles are smaller than 40 µm;
45–100 vol % of the particles are smaller than 20 µm;
5–100 vol % of the particles are smaller than 10 µm;
1–80 vol % of the particles are smaller than 5 µm;
$d(v)_{50}$ is from 1.3 µm to 32 µm; or
a combination thereof,
$d(v)_{50}$ being the particle size below which 50% by volume of the particles in the composition is found.

15. The powder coating composition of claim 1, which further comprises one or more coloring agents.

16. The powder coating composition of claim 15, wherein the one or more coloring agents is present in an amount of not more than 40% by weight of the powder coating composition, not including the weight of any dry blend additives, if present.

17. A process for forming a coating on a substrate, which comprises applying the composition of claim 1 to the substrate, such that the composition adheres to, and forms a continuous coating over at least part of, the substrate.

18. The process of claim 17, wherein the coated substrate is subjected to a heat treatment or radiant energy to cure the composition and adhere it to the substrate.

19. The process of claim 18, wherein the coating thickness is no more than 150 microns.

20. The process of claim 17, wherein the composition is applied by an electrostatic spray means for forming the coating on the substrate.

* * * * *